(12) United States Patent
Horii

(10) Patent No.: US 7,397,572 B1
(45) Date of Patent: Jul. 8, 2008

(54) PRINTER HAVING SELECTABLE PRINTING PARAMETERS AND A METHOD THEREFOR

(75) Inventor: Minoru Horii, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/517,149

(22) Filed: Mar. 2, 2000

(30) Foreign Application Priority Data

Mar. 5, 1999 (JP) .............................. P11-059429

(51) Int. Cl.
*G06F 15/00* (2006.01)
*G06F 3/12* (2006.01)
(52) U.S. Cl. .................................................. 358/1.13
(58) Field of Classification Search ........... 358/1.1–1.9, 358/1.11–1.18, 537, 527, 518
See application file for complete search history.

(56) References Cited

U.S. PATENT DOCUMENTS

| | | | | |
|---|---|---|---|---|
| 4,958,221 A | * | 9/1990 | Tsuboi et al. | 358/538 |
| 5,119,182 A | * | 6/1992 | Tsuboi et al. | 358/500 |
| 5,204,736 A | | 4/1993 | Abe | 358/500 |
| 5,377,013 A | * | 12/1994 | Oka et al. | 358/501 |
| 5,495,539 A | | 2/1996 | Sieverding | 382/276 |
| 5,604,844 A | | 2/1997 | Nishiyama | 358/1.12 |
| 5,606,395 A | * | 2/1997 | Yang et al. | 399/81 |
| 5,752,075 A | | 5/1998 | Kikinis | 710/1 |
| 5,809,366 A | * | 9/1998 | Yamakawa et al. | 399/39 |
| 5,987,175 A | | 11/1999 | Imaizumi et al. | 382/232 |

FOREIGN PATENT DOCUMENTS

| | | |
|---|---|---|
| EP | 0 366 427 A2 | 2/1990 |
| EP | 08 317 218 | 5/1995 |
| EP | 0 772 116 A1 | 7/1997 |
| JP | 5-338229 | 12/1993 |
| JP | 7-203191 | 8/1995 |
| JP | 9-52355 | 2/1997 |
| JP | 10-264485 | 10/1998 |
| JP | 10-328134 | 12/1998 |
| JP | 11-48586 | 2/1999 |

\* cited by examiner

*Primary Examiner*—Gabriel Garcia
(74) *Attorney, Agent, or Firm*—Reed Smith LLP

(57) ABSTRACT

A printer and a printing method are capable of greatly improving printing efficiency. In a printer and a printing method for printing a first image based on supplied first print data on a printing medium, when a predetermined operation mode is selected, second print data for a frame image formed by arranging second images of several kinds obtained by applying image processing different from each other to the first image, in a predetermined arrangement pattern and then, the frame image based on the second print data is printed on the printing medium. Therefore, it is possible to greatly shorten the time for obtaining a printing medium in which the image processing is performed in a desired sate and to previously avoid the printing medium from being wasted. Thus, it is possible to realize the printer and the printing method capable of greatly improving the printing efficiency.

4 Claims, 6 Drawing Sheets

PRINTER HAVING SELECTABLE PRINTING PARAMETERS AND A METHOD THEREFOR

BACKGROUND OF THE INVENTION

1. Field of the Invention

This present invention relates to a printer and a printing method, and more particularly, is suitably applied to a printer and a printing method for printing a color image based on input print data on a printing medium.

2. Description of the Related Art

This type of printer can perform image adjustment processing, such as color adjustment and lightness adjustment, on a color image based on print data, which is supplied from a personal computer in accordance with operations by an operator, by applying predetermined signal processing to the print data.

In actual, in the case where, for example, the color adjustment out of the above described image adjustment processing is performed, this printer can fine-adjust the tint of a color image by changing levels of primary color signals for red (R), green (G), and blue (B) forming print data, in accordance with the adjustment by an operator.

In general, rising signal levels of three primary colors has a characteristic that colors (red, green, blue) shown by primary color signals are emphasized, and lowering the signal levels has a characteristic that complementary colors (cyan, magenta, yellow) of colors shown by the primary color signals are emphasized.

However, for an operator who adjusts a color image based on print data to a desired tint different from the present tint in the above described color adjustment, it is difficult to determine which color should be selected among three primary colors and further, how much a signal level of a selected color should be changed. Therefore, the operator actually adjusts the present tint to a desired tint by his intuition.

As one method of solving the above described problems, a printer is proposed which is configured so that whenever the image adjustment processing are updated in accordance with operations by an operator, the updated image adjustment is reflected on a color image and the reflected result can be output as a video signal to a monitor which is connected as an external unit. Thereby, the operator can perform the above described image adjustment processing while visually confirming a color image based on the video signal displayed on the monitor.

Since a method of mixing colors using the additive process is applied to the above described color image based on a video signal displayed on a monitor and a method of mixing colors using the subtractive process is applied to a color image actually printed on a printing medium, a tint of a color image subjected to image adjustment processing may slightly differ between the case where the color image is displayed on a monitor and the case where the color image is actually printed on a printing medium.

For example, since the Japanese skin color is comprised of red, green, and blue with a higher ratio in this order among three primary colors, raising a blue signal level actually makes the skin color pinkish, not bluish, and lowering a red signal level actually makes the skin color yellowish and whitish, not cyanic (light bluish). This is the reason why the color adjustment processing is very difficult.

An operator purposes obtaining a printing medium having a color image printed thereon, and a color image actually printed on the printing medium frequently has a tint different from a tint desired by the operator even if the above described color adjustment processing is performed on the basis of a color image displayed on a monitor. In this case, it is necessary to repeat the above described color adjustment processing many times until the tint desired by the operator is obtained and further, the operator has to print the color image whenever the color adjustment is performed, in order to visually confirm the tint. As a result, problems occur that the printing medium is wasted and the time also wastefully elapses.

SUMMARY OF THE INVENTION

In view of the foregoing, an object of this invention is to provide a printer, printing method, and printing medium capable of significantly improving the printing efficiency.

The foregoing object and other objects of the invention have been achieved by the provision of a printer for printing a first image based on supplied first print data on a printing medium. The printer comprises: an image processing means for applying predetermined image processing to first print data; and a printing means for printing the first image based on the first print data subjected to the image processing, on the printing medium. The image processing means generates second print data for a frame image which is formed by arranging second images of several kinds obtained by applying image processing different from each other to the first image, in a predetermined arrangement pattern, when a predetermined operation mode is selected, and the printing means prints the frame image based on the second print data on the printing medium.

As a result, the printer allows an operator to easily determine a tendency of the image-quality adjustment according to the image processing of the first image while visually confirming each second image arranged on the basis of the first image in the frame image printed on the printing medium. Thus, the time for obtaining a printing medium in which the image processing is performed in a desired state can be greatly shortened and the printing medium can be avoided in advance from being wasted.

Moreover, the present invention provides a printing method of printing a first image based on supplied first print data on a printing medium, which comprises: a first step of applying predetermined image processing to the first print data; and a second step of printing a first image based on the first print data subjected to the image processing, on a printing medium. When a predetermined mode is selected, in the first step, second print data for a frame image which is formed by arranging second images of several kinds obtained by applying image processing different from each other to the first image, in a predetermined arrangement pattern is generated, and in the second step, a frame image based on the second print data is printed on the printing medium.

As a result, the printing method allows an operator to easily determine a tendency of the image quality adjustment according to the image processing of the first image while visually confirming each second image arranged on the basis of the first image, in the frame image printed on the printing medium. Thus, the time for obtaining a printing medium in which the image processing is performed in a desired state can be greatly shortened and the printing medium can be previously avoided from being wasted.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Configuration of a Printer of this Embodiment

Figure 1:
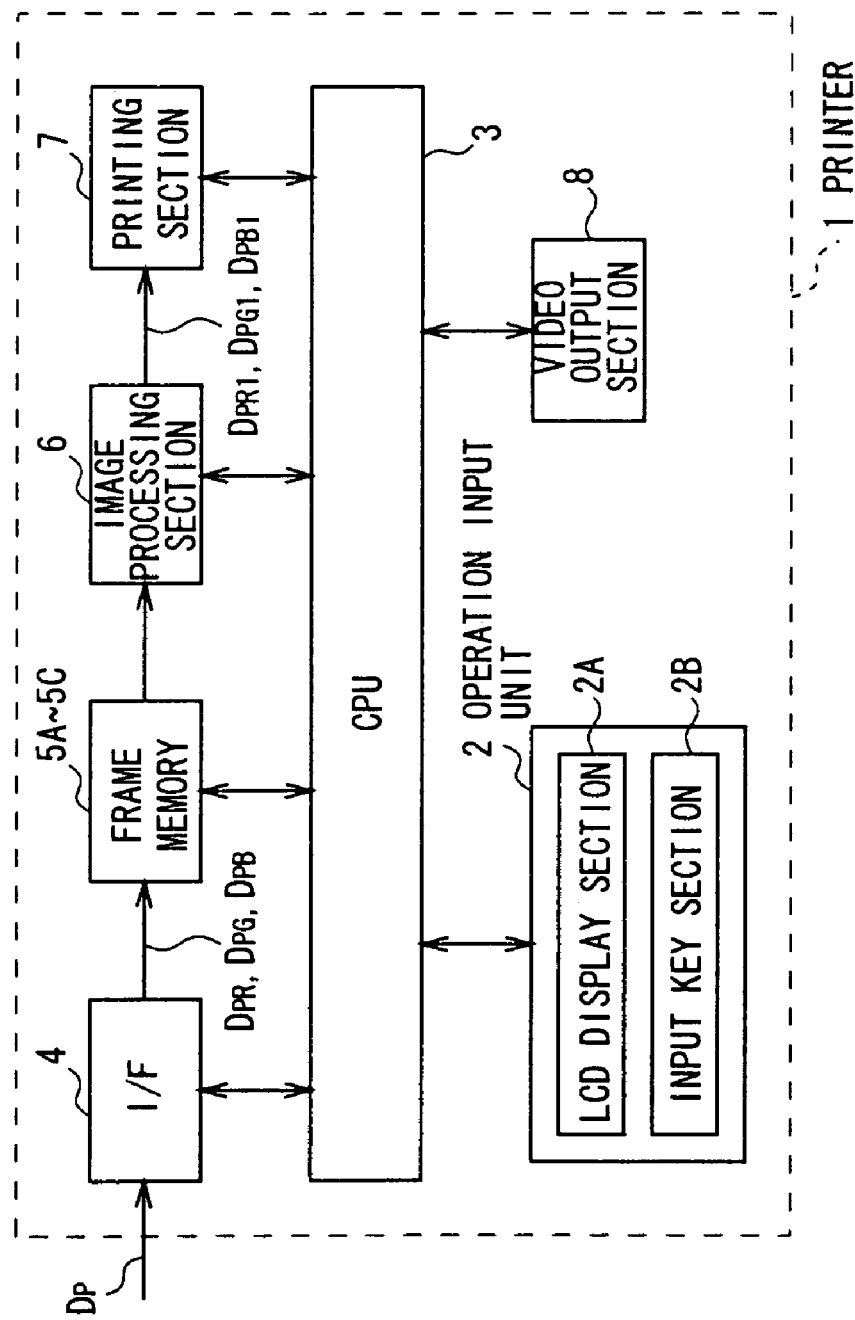
FIG. 1 is a block diagram showing a configuration of a printer of the present embodiment.

FIG. 1 shows a printer to which the present invention is applied as a whole, and is configured so that when predetermined print data $D_P$ is supplied from a not-illustrated personal computer, a color image based on the print data $D_P$ is adjusted to a desired tint in accordance with operations by an operator and then, the color-adjusted color image is printed on a predetermined printing medium (not illustrated).

In this printer 1, an operation input unit 2 comprised of a liquid crystal display (LCD) display section 2A and an input key section 2B is connected with a CPU 3, so that an operator can supply various commands to the CPU 3 with the operation input unit 2.

The items of various operations are arranged and displayed on the LCD display section 2A of the operation input unit 2 as display items so that an operator can transmit a command relating to a display item designated out of these display items with the input key section 2B, to the CPU 3. Moreover, the input key section 2B is provided with a printing mode key and a color-adjustment guide mode key (both are not illustrated), so that the CPU 3 can receive an operation mode of the printer 1 designated with these mode designation keys.

Actually, in the printer 1, when the print data $D_P$ is supplied from a personal computer through an interface 4 in the printing mode, the CPU 3 divides the print data $D_P$ into color print data $D_{PR}$, $D_{PG}$, and $D_{PB}$ corresponding to colors (R, G, B) and writes them in their corresponding frame memories 5A to 5C every one print image, in accordance with the command C1 supplied from the operator.

Then, the CPU 3 reads the color print data $D_{PR}$, $D_{PG}$, and $D_{PB}$ out of the respective frame memories 5A to 5C at predetermined timings and then, transmits them to an image processing section 6.

The image processing section 6 is provided with a color conversion table having a standard printing characteristic for each color, which performs color adjustment correspondingly to an adjustment curve set to each color before and after color adjustment processing and then, executes the processing for isolating unnecessary data (so-called masking). Then, the image processing section 6 applies the density duty time conversion (so-called gamma compensation) to the obtained color print data using a set predetermined heat compensation coefficient and then, transmits the resultant print image data $D_{PR1}$, $D_{PG1}$, and $D_{PB1}$ to a printing section 7.

The printing section 7 is configured so as to be able to convert the print image data $D_{PR1}$, $D_{PG1}$, and $D_{PB1}$ into current signals, then, supply the current signals to a plurality of exothermic resistors which is provided on a head surface of a heat transfer head, in order to make the exothermic resistors produce heat and thereby print a desired color image based on the print image data $D_{PR1}$, $D_{PG1}$, and $D_{PB1}$ using the produced heat, on a printing surface of the printing medium.

Note that, in the printer 1, a video output section 8 having an interface for external connection is connected to the CPU 3. The video output section 8 is configured so as to convert the print image data $D_{PR1}$, $D_{PG1}$, and $D_{PB1}$ transmitted from the image processing section 6 into video signals according to a predetermined signal system and output them under the control of the CPU 3.

In this printer 1, in addition to the above described configuration, when an operator specifies a color-adjustment guide mode with the operation input unit 2 in order to perform a color image adjustment on a color image based on the print data $D_{PR}$, $D_{PG}$, and $D_{PB}$, the CPU 3 reads a predetermined color-adjustment program from its internal ROM (not illustrated) and executes the program.

First, the CPU 3 controls the image processing section 6 in accordance with the color adjustment program and thereby, changes the parameters of signal levels of the print image data $D_{PR1}$, $D_{PG1}$, and $D_{PB1}$ generated by the image processing section 6. Then, it sets the parameter value (R, G, B) corresponding to the signal levels as initialization value (0, 0, 0) and further, changes the parameter values by predetermined amount (e.g. by three) in the plus direction or minus direction for each color on the basis of the initialization values and thereby sets the obtained plural parameter values (R, G, B) as (+3, 0, 0), (−3, 0, 0), (0, +3, 0), (0, −3, 0), (0, 0, +3), and (0, 0, −3).

Since the predetermined amount for changing the initialization value is set to a value "3" almost a half of the maximum values (e.g. ±7) in the plus and minus directions in a range of parameter values which can be used for the color adjustment, a tint change is prevented from being extremely increased among a plurality of color images displayed on a printing medium after printed, and the operator can easily and visually confirm the state and tendency of the tint change.

In this case, a setting item corresponding to image adjustment processing (in this case, color adjustment processing) is displayed on the LCD display section 2A of the operation input unit 2, and the operators can change an initialization value to set parameter values (including the initialization value) which are set and input to the setting items, by the same amount with the input key section 2B.

In this way, the image processing section 6 can generate a color image (hereafter referred to as present set image) based on the print data $D_{PR}$, $D_{PG}$, and $D_{PB}$ corresponding to an initialization value under the control of the CPU 3 and moreover, generate color images (hereafter referred to as setting changed images) which are obtained by applying the color adjustment in accordance with the parameter values to the present set image.

Moreover, under the control of the CPU 3, the image processing section 6 reduces the present set image and all the plural setting changed images into a predetermined size, thereafter arranges them in a predetermined arrangement pattern in which the plurality of setting changed images surrounds the present set image, and adds the parameter values under the respectively corresponding present set image and setting changed images, and thereby can generate one frame image (hereafter referred to as color-adjustment guide image), and transmits the color-adjustment guide image to the printing section 7 as print image data $D_{PR1}$, $D_{PG1}$, and $D_{PB1}$.

In this way, the printing section 7 can print a color-adjustment guide image based on the print image data $D_{PR1}$, $D_{PG1}$, and $D_{PB1}$ supplied from the image processing section 6 on a printing surface of a predetermined printing medium under the control of the CPU 3. Then, the present set image is displayed in the center of thus obtained printing surface of the printing medium and the plural setting changed images are also displayed in the predetermined arrangement pattern centering the present set image, and moreover the parameter values are displayed under the respectively corresponding present set image and setting changed images.

Thereafter, in accordance with the operations by the operator, the CPU 3 updates and sets the parameter values by the same amount for each color (red, green, blue) with respect to the present set image and the setting changed images in the color-adjustment guide image and then, controls the image processing section 6 and thereby applies the above-described color adjustment processing to the present set image and the setting changed images in accordance with the respective updated parameter values.

As a result, the printing section 7 displays the present set image and the plural setting changed images subjected to the color adjustment in accordance with the updated parameter values, and also displays the updated parameter values under the respectively corresponding present set image and setting changed images.

(2) Processing Procedure RT1 of Color-Adjustment-Guide Printing

Figure 2:
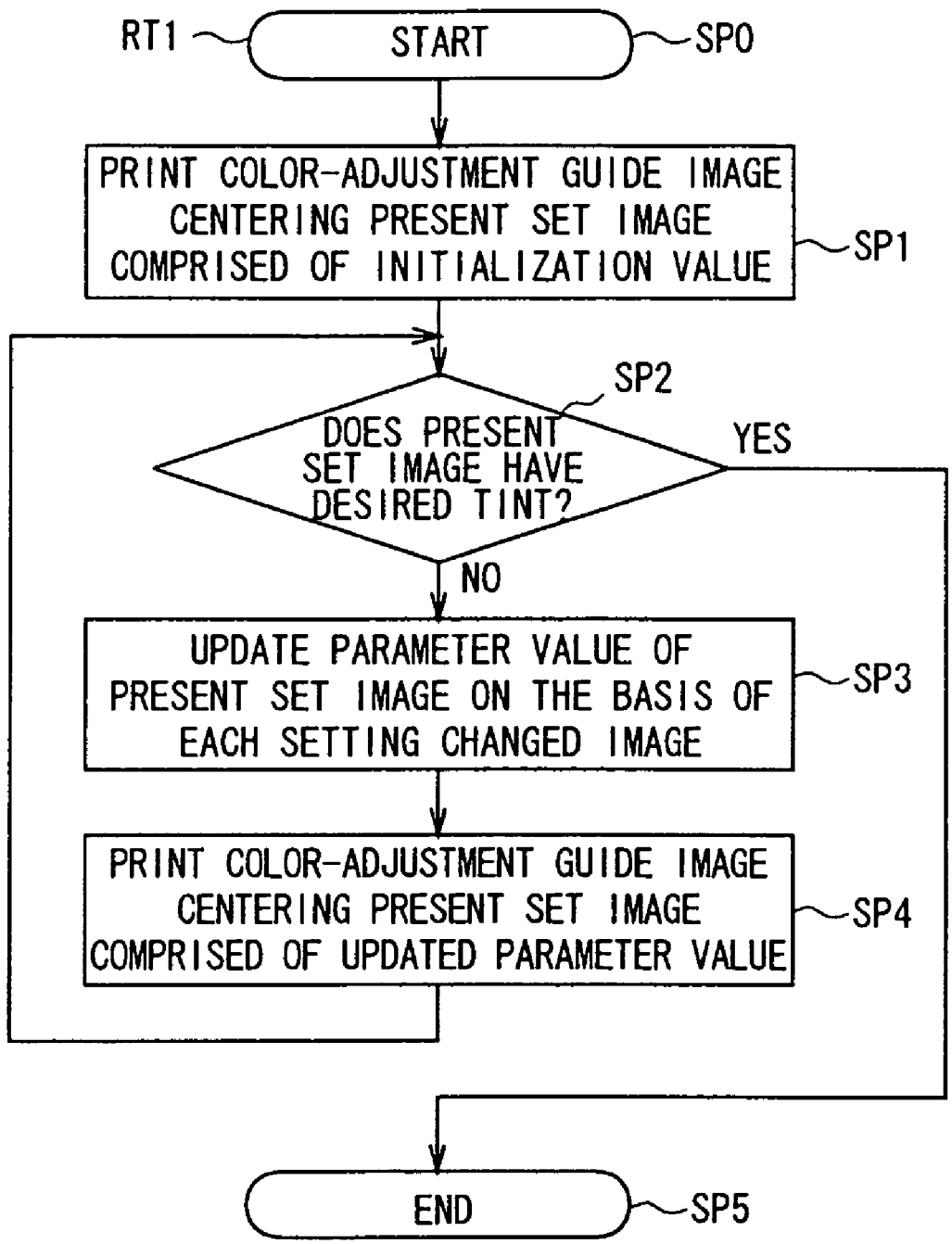
FIG. 2 is a flow chart explaining a processing procedure of color-adjustment guide printing according to the present embodiment.

When a color-adjustment guide mode is actually selected in accordance with operations by an operator in the printer 1, the CPU 3 starts the processing procedure RT1 of color-adjustment guide printing shown in FIG. 2 in step SP0, and in following step SP1, prints a color-adjustment guide image which is a frame image centering a present set image which is set to an initialization value, on a printing surface of a printing medium.

Figure 3:
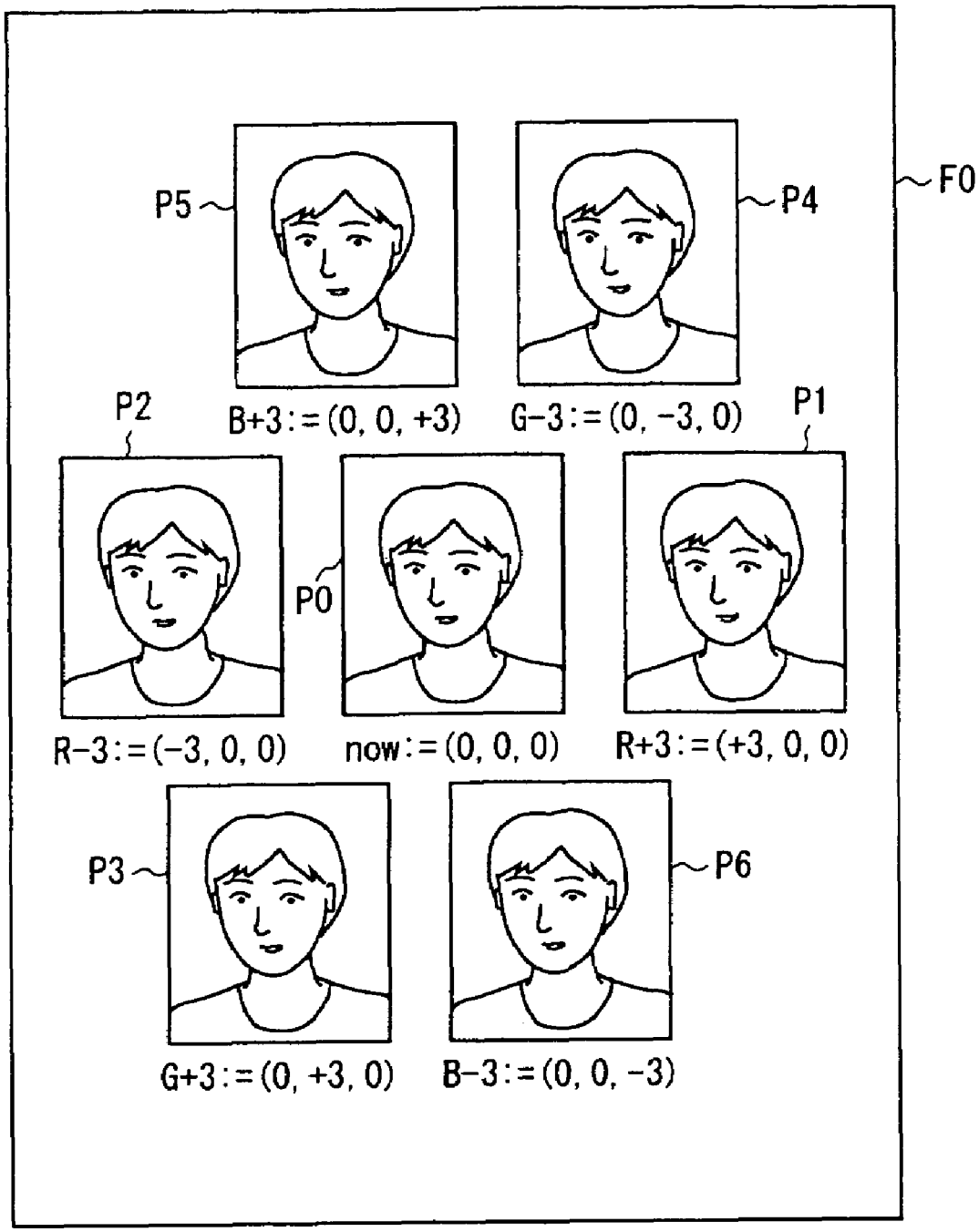
FIGS. 3 to 5 are schematic plane views showing a printing medium having a color-adjustment guide image printed thereon.

As shown in FIG. 3, in the color-adjustment guide image F0 printed on the printing surface of the printing medium, a present set image P0 is displayed in the center and plural setting changed images P1 to P6 obtained by applying the color adjustment in plus or minus direction for each color (red, green, blue) to the present set image P0 are displayed so as to surrounding the present set image P0.

In this case, a parameter value set to the present set image P0 is equal to an initialization value (0, 0, 0) and parameter values set to the setting changed images P1 to P6 are equal to (+3, 0, 0), (−3, 0, 0), (0, +3, 0), (0, −3, 0), (0, 0, +3) and (0, 0, −3) respectively obtained by adding 3 in the plus direction or the minus direction for each color.

Then, the CPU 3 proceeds to step SP2 to judge whether the present set image P0 has a tint desired by an operator or not and then, directly proceeds to step SP5 when an affirmative result is obtained to complete the processing procedure RT1 of the color-adjustment guide printing.

On the contrary, obtaining a negative result in step SP2 represents that the present set image P0 has a tint not desired by the operator. In this case, the CPU 3 proceeds to step SP3 to update the parameter value of the present set image P0 on the base of tints of the setting changed images P1 to P6.

For example, when the operator desires a gray background and visually confirms that the setting changed image P2 has a background color closest to the desired gray among the setting changed images P1 to P6 and its red color should be slightly suppressed, the CPU 3 updates the parameter value of the present set image P0 to (−4, 0, 0) so as to slightly further suppress the red color of the parameter value (−3, 0, 0) of the setting changed image P2.

Figure 4:
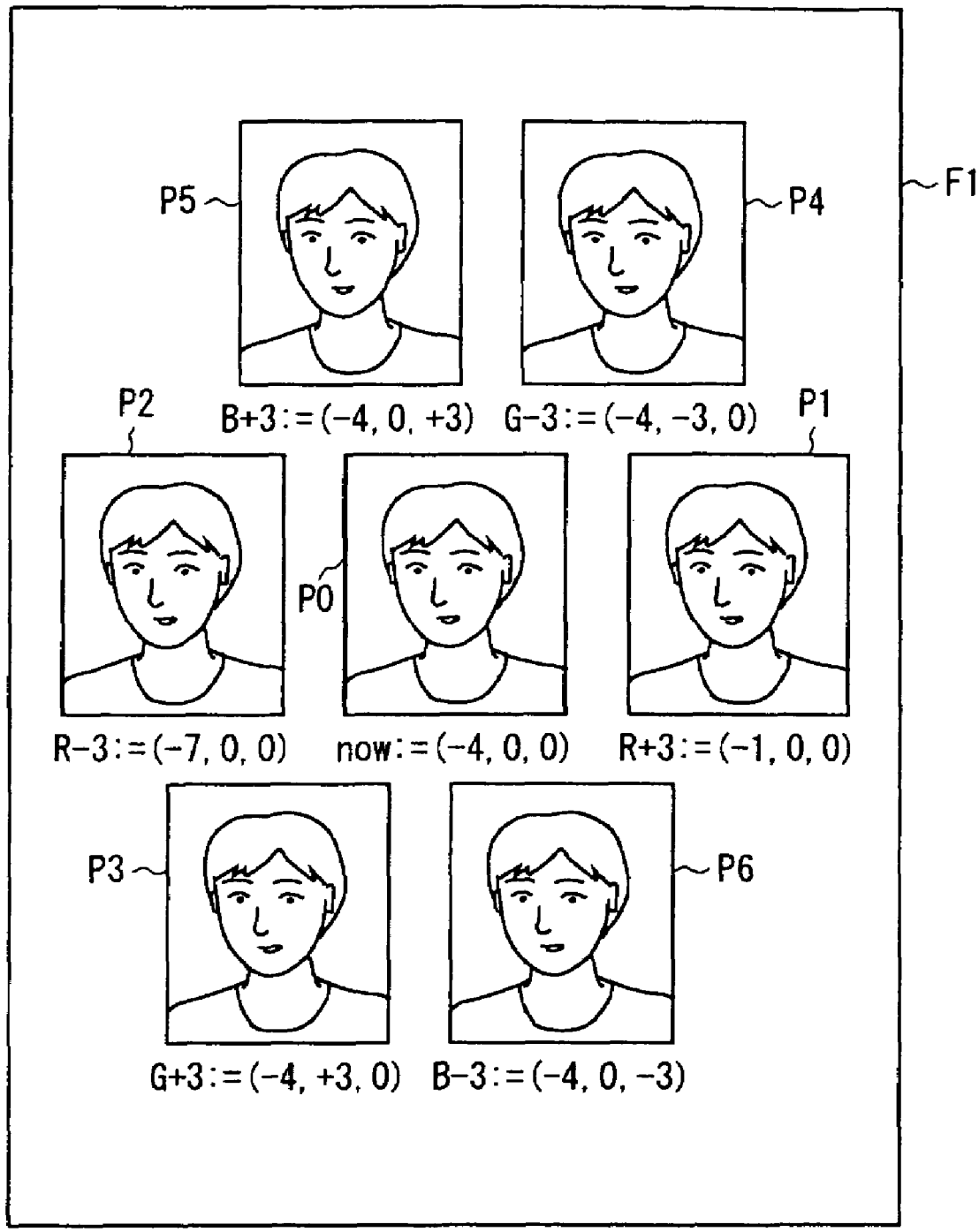

As a result, as shown in FIG. 4, in a color-adjustment guide image F1, a parameter value set to the present set image P0 becomes equal to (−4, 0, 0), and parameter values set to the setting changed images P1 to P6 respectively become equal to (−1, 0, 0), (−7, 0, 0), (−4, +3, 0), (−4, −3, 0), (−4, 0, +3), and (−4, 0, −3), respectively, by adding ±3 to each color (red, green blue) of the setting value of the present set image P0.

Then, the CPU 3 proceeds to step SP4 to execute printing using the updated parameter value and then, returns to step SP2 to judge whether the present set image printed on the printing medium has a tint desired by the operator or not.

When an affirmative result is obtained in step SP2, the CPU 3 directly advances to step SP5 to complete the processing procedure RT1 of color-adjustment guide printing.

To the contrary, obtaining a negative result in step SP2 represents that the operator does not obtain a desired tint yet although the parameter value is updated. In this case, the CPU 3 repeats the processing of steps SP3, SP4, and SP2 until the present set image has the desired tint.

Specifically, as for the color-adjustment guide image F1 shown in FIG. 4, the operator visually confirms that a color of a background image closest to desired gray is neutral of the present set image P0 and the setting changed images P2 and P3 out of the plural setting changed images P1 to P6, the operator updates the parameter value of the present set image P0 to (−5, 0, +2) by obtaining a neutral tint of the parameter value (−4, 0, 0) of the present set image P0, the parameter value (−4, 0, +3) of the setting changed image P2, and the parameter value (−7, 0, 0) of the setting changed image P3.

Figure 5:
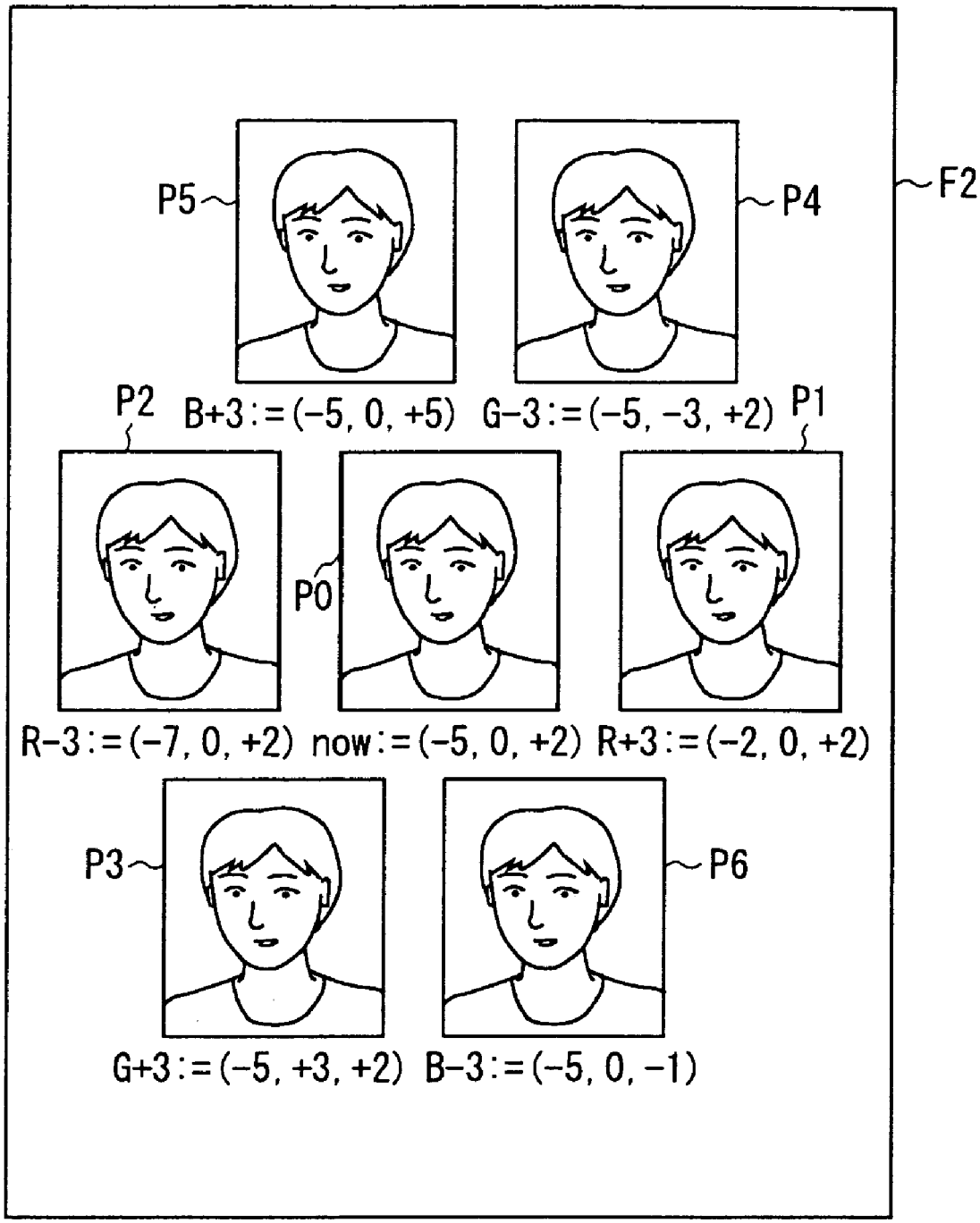

As a result, as shown in FIG. 5, in a color-adjustment guide image F2, a parameter value set to the present set image P0 becomes equal to (−5, 0, +2), and parameter values set to the setting changed images P1 to P6 respectively become equal to (−2, 0, +2), (−7, 0, +2), (−5, +3, +2), (−5, −3, +2), (−5, 0, +5), and (−5, 0, −1) obtained by adding ±3 to each color (red, green, blue) of the setting value of the present set image P0.

As a result, as for the color-adjustment guide image F2 shown in FIG. 5, the setting changed image P3 is visually confirmed out of the present set image P0 and the plurality of setting changed images P1 to P6, as one which has the background image closest to desired gray and the optimum portrait color.

(3) Operations and Advantages of this Embodiment

In the above described configuration, the printer 1 generates plural setting changed images obtained by applying the color adjustment using a predetermined parameter value for each color (red, green, blue) to a present set image based on print data $D_P$, in the color-adjustment guide mode. Then, it prints a color-adjustment guide image obtained by arranging the setting changed images in a predetermined arrangement pattern so as to surround the present set image, on a printing medium.

As for the color-adjustment guide image printed on the printing medium, the plural setting changed images arranged around the present set image are color images obtained by changing tints of the present set image in plus or minus direction for each color. Therefore, an operator can easily and visually confirm a state in which tints of setting changed images are changed so as to be successive on the basis of the tint of the present set image.

Moreover, in the color-adjustment guide image printed on a printing medium, parameter values are numerically displayed under the respectively corresponding present set image and plural setting changed images. Therefore, an operator can quantitatively confirm the difference in tints among the present set image and the setting changed image and as a result, he can grasp a degree of color adjustment on the basis of the parameter values.

Then, the operator selects a setting changed image having a tint closest to a desired tint, out of the plural setting changed images, and updates parameter value within a settable range on the basis of a parameter value set to the selected setting changed image. Thereby, a tint of a present set image is adjusted using the updated parameter value.

In this case, tints of the plural setting changed images are also adjusted on the basis of the updated parameter value. Therefore, when printing an obtained color-adjustment guide image on a printing medium, the operator can visually confirm the states of the present set image and setting changed images subjected to the color adjustment.

Thus, whenever the operator updates the parameter value by the above mentioned method, the tint of the present set image is adjusted and the tints of the setting change images arranged around the present set image are also adjusted. Therefore, the operator can easily find the tendency to obtain a desired tint by visually confirming tints of these plural setting changed images. As a result, it is possible to perform color adjustment in a very short time and with a small number of prints, as compared to a case of printing only a present set image.

According to the above described configuration, in the color-adjustment guide mode, a color-adjustment guide image is generated by arranging the plural setting changed images changed so that tints are successive on the basis of the present set image based on the printing data $D_P$, around the present set image in a predetermined arrangement pattern. And the color-adjustment guide image is printed on a printing medium. Thereby, an operator can determine a tendency of color adjustment of the present set image while visually confirming the tints of the setting changed image arranged around the present set image. Thus, it is possible to greatly shorten the time required for color adjustment and realize the printer 1 capable of avoiding a printing medium from being wasted.

Moreover, when an operator performs color adjustment of a present set image by updating the present set image while visually confirming a color-adjustment guide image printed on a printing medium by the printer 1, the tint of each setting changed image is also changed in the same adjustment and at the same change rate as the updated present set image. Thereby, whenever the above described update is performed, not only the tint of the present set image but also the tints of the setting changed images become close to a desired tint. Therefore, it is possible to further shorten the time required for color adjustment.

(4) Other Embodiment

Note that, in the above described embodiment, the print data (the first print data) $D_P$ is supplied to the printer 1 from the personal computer. However, the present invention is not restricted to this case and the print data $D_P$ can be supplied from a video recorder. Further, the print data $D_P$ can be reproduced from a recording medium such as a floppy disk, a personal computer (PC) card, a magnetic optical (MO) disk and then supplied to the printer 1.

Moreover, in the above described embodiment, the present invention is applied to the heat-transfer-type printer 1 provided with the printing section (printing means) 7 having the heat-transfer head. However, the present invention is not restricted to the above described case. In short, the present invention can be widely applied to other types of printer (e.g. ink-jet printer and laser printer) as long as the apparatuses are printers to print a present set image (first image) based on supplied print data $D_P$ on a printing medium.

Furthermore, in the above described embodiment, in the color-adjustment guide images (frame images) F0 to F2, the present set image (first image) P0 is arranged in the center and the plural setting changed images (second images) P1 to P6 are arranged centering the present set image P0 in an arrangement pattern. However, the present invention is not restricted to the above described case. Another arrangement pattern can be applied as a arrangement pattern of the setting changed images P1 to P6 as long as an operator can visually confirm the image processing of the setting changed images P1 to P6 on the basis of the present set image P0 to be actually printed. In addition, the number of setting changed images as second images can be optionally set in accordance with an arrangement pattern.

Furthermore, in the above described embodiment, in the color-adjustment guide images (frame images) F0 to F2, parameter values set to the present set image (first image) and plural setting changed images (second images) P1 to P6 are displayed under the respectively corresponding present set image P0 and plural setting changed images P1 to P6. However, the present invention is not restricted to the above described case. The parameter values set as described above can be displayed at any positions in the color-adjustment guide images F0 to F2 as long as an operator can visually confirm that each parameter value correspond to any of the present set image P0 and the setting changed images P1 to P6.

Furthermore, in the above described embodiment, the operation input unit 2 of the printer 1 is utilized to select a color-adjustment guide mode (predetermined operation mode), input various parameter values or the like. However, the present invention is not restricted to the above described case. An input section (including a keyboard and a mouse) of an externally-connected personal computer (not illustrated) can be used instead of the operation input unit 2. Further, it is also possible to generate the present set image and the setting changed images and form a frame image in which parameters are also displayed, with the externally-connected personal computer (not illustrated), and to print the frame image with the printer 1.

Furthermore, in the above described embodiment, the image processing section 6 provided in the printer 1 is used as an image processing means for applying predetermined image processing to the supplied print data (first print data) $D_P$. In short, the present invention can be widely applied to various types of image processing means such as a personal computer, as long as it is possible to generate the print image data (second print data) $D_{PR1}$, $D_{PG1}$, and $D_{PB1}$ for the color-adjustment guide images (frame images) F0 to F2 obtained by arranging the plural setting changed images (second images) P1 to P6 obtained by applying the color-adjustments (image-processing) different from each other to the present set image (first image) P0, in a predetermined arrangement pattern when a color-adjustment guide mode (predetermined operation mode) is selected.

Further, as the image processing to be applied to the print data $D_P$ in the image processing section (image processing means) 6, image processing having image-quality adjusting functions such as lightness adjustment, masking, γ compensation, enlargement/reduction, sharpness adjustment, or trimming, can be utilized, other than the color adjustment.

In this case, when a predetermined operation mode is selected, processing corresponding to image processing having the selected image quality adjusting function is performed. Note that, in a printer which does not perform color adjustment processing, a present set image (first image) based on supplied image data $D_P$ can be a black-and-white image, not a color image.

Figure 6:
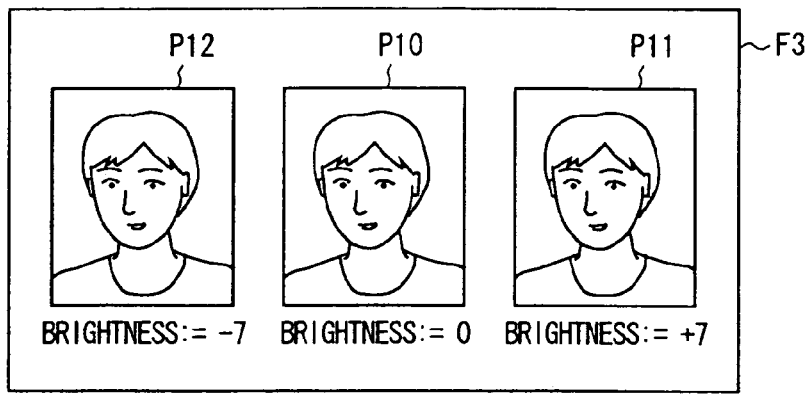
FIGS. 6 to 8 are schematic plane views each showing a printing medium having a frame image printed thereon, according to another embodiment.

For example, as shown in FIG. 6, when an operation mode corresponding to lightness adjustment processing is selected, parameter values on the basis of a brightness-signal level of the print data $D_P$ is set to the present set image (first image) P10 and the setting changed images (second images) P11 and P12. When assuming that the present set image P10 has normal brightness (parameter value "0"), an advantage that the printing efficiency is greatly improved is obtained similarly to the case of this embodiment, by printing a lightness-adjustment guide image F3 in which the setting changed image P11 having a high brightness (parameter value "+7") is displayed at the right side and the setting changed image P12 (parameter value "−7") having a low brightness is displayed at the left side on the basis of the present set image P10, on a printing medium.

Figure 7:
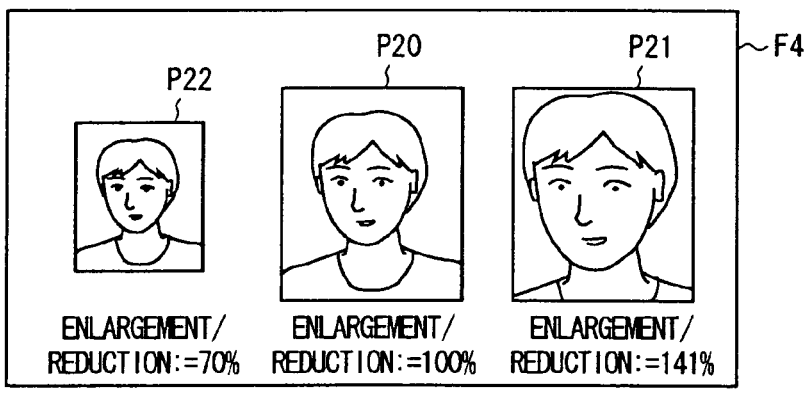

Moreover, as shown in FIG. 7, when an operation mode corresponding to enlargement/reduction processing is selected, parameter values on the basis of the size of a frame image based on the print data $D_P$ is set to a present set image (first image) P20 and setting changed images (second images) P21 and P22. When assuming that the present set image P20 has a normal size (parameter value "100"), an advantage that the printing efficiency is greatly improved is obtained similarly to the case of this embodiment, by printing an enlargement/reduction guide image F4 in which the enlarged (parameter value "141") setting changed image P21 is displayed at the right side and the reduced (parameter value "70") setting changed image P22 is displayed at the left side on the basis of the present set image P20, on a printing medium.

Figure 8:
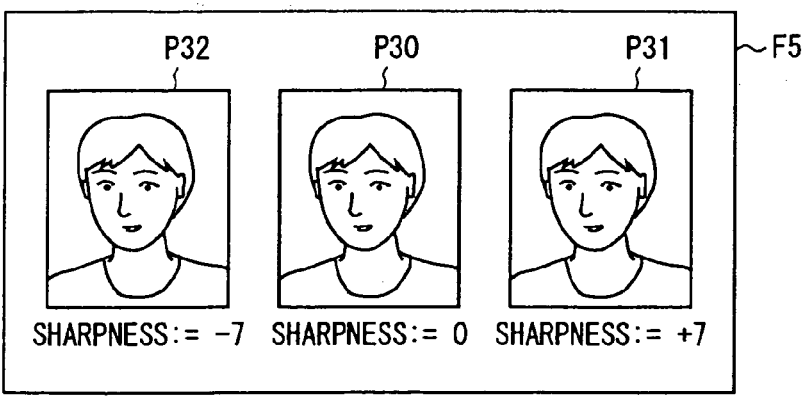

Furthermore, as shown in FIG. 8, when an operation mode corresponding to sharpness processing is selected, parameter values on the basis of the sharpness of the outline of a frame image based on the pint data $D_P$ is set to a present set image (first image) P30 and setting changed images (second images) P31 and P32. When assuming that the present set image P30 is a standard (parameter value "0"), it is possible to obtain an advantage that the printing efficiency is greatly improved similarly to the case of this embodiment, by printing a sharpness guide image F5 in which the setting changed image P31 having a emphasized outline (parameter value "+7") is displayed at the right side and the setting changed image P32 having a fuzzy outline (parameter value "−7") is displayed at the left side on the basis of the present set image P30, on a printing medium.

As described above, according to the present invention, a printer for printing a first image based on supplied first print data on a printing medium comprises: an image processing means for applying predetermined image processing to the first print data; and a printing means for printing a first image based on the first print data subjected to the image processing, on the printing medium. When a predetermined operation mode is selected, the image processing means generates second print data for a frame image formed by arranging second images of several kinds obtained by applying image processing different from each other to the first image, in a predetermined arrangement pattern, and the printing means prints the frame image based on the second print data on the printing medium. Thereby, it is possible to greatly shorten the time for obtaining a printing medium to which the image processing is applied in a desired sate and to avoid the printing medium from being wasted. Thus, it is possible to realize a printer capable of greatly improving the printing efficiency.

Moreover, according to the present invention, a printing method for printing a first image based on supplied first print data on a printing medium, comprises: the first step of applying predetermined image processing to the first print data; and the second step of printing a first image based on the first print data subjected to the image processing, on the printing medium. When a predetermined operation mode is selected, in the first step, second print data for a frame image formed by arranging second images of several kinds obtained by applying image processing different from each other to the first image, in a predetermined arrangement pattern is generated, and in the second step, a frame image based on the second image data is printed on the printing medium. Thereby, it is possible to greatly shorten the time for obtaining a printing medium to which the image processing is applied in a desired state and to avoid the printing medium from being wasted. Thus, it is possible to realize a printing method capable of greatly improving the printing efficiency.

In one embodiment, the present invention is a printer for printing a first image based on supplied first print data on a printing medium, comprising, an image processor for applying predetermined image processing based on a present setting to the entire first print data; and a printer for printing the entire first image based on the first print data subjected to the image processing on the printing medium, wherein the image processor, when a predetermined operation mode is selected, generates second print data for a frame image obtained by arranging second entire images including an image based on the present setting of several kinds of images obtained by applying image processing settings that are different from each other to the first image, in a predetermined arrangement pattern, and the image processor updates the first image based on the present setting by one of the image processing settings that are different from each other, and generates updated second print data for a frame image obtained by arranging entire images including the updated image based on the present setting and several kinds of images by applying image processing settings that are different from each other in a predetermined arrangement pattern, and the printer prints the frame image based on the second print data on the printing medium. Various other embodiments include, for example, the frame image is formed by arranging said entire first image in the center and arranging said second entire images of several kinds in a predetermined arrangement pattern centering the first image, or the frame image is formed by displaying parameter values set to said first image and said second images of several kinds at predetermined positions respectively corresponding to the first image and the second images of several kinds.

In another embodiment, the present invention is a printer for printing a first image based on supplied first print data on a printing medium, comprising, an operation input device for selecting predetermined image processing for said first print data, an image processor for applying the selected predetermined image processing based on a present setting to said first print data, and a printer for printing said entire first image based on said first print data subjected to said image processing, on said printing medium, wherein, the image processor, when a predetermined operation mode is selected, generates second print data for a frame image formed by arranging second entire images including an image based on the present setting of several kinds of images obtained by applying image processing settings that are different from each other to said first image, in a predetermined arrangement pattern, and said image processor updates said first image based on the present setting by one of the image processing settings that are different from each other, and generates updated second print data for a frame image obtained by arranging entire images including said updated image based on the present setting and several kings of images by applying image processing settings that are different from each other in a predetermined arrangement pattern, and said printer prints said frame image based on second print data on said printing medium. In one alternative, the frame image may be, for example, formed by arranging said first entire image in the center and arranging said second entire images of several kinds in said predetermined arrangement pattern centering the first entire image. In another alternative, the frame image is formed by displaying parameter values set to said first image and said second images of several kinds at predetermined positions respectively corresponding to the first image and the second images of several kinds.

In yet another embodiment, the present invention is a printing method of printing a first image based on supplied first print data on a printing medium, comprising, a first step of applying predetermined image processing based on a present setting to said first print data, and a second step of printing said entire first image based on said first print data subjected to said image processing on said printing medium, wherein, in said first step, when a predetermined operation mode is selected, generating second print data for a frame image obtained by arranging second entire images including an image based on the present setting of several kinds of images obtained by applying the image processing settings different from each other to said first image, in a predetermined arrangement pattern, and updating said first image based on the present setting by one of the image processing settings that are different from each other, and generating updated second print data for a frame image obtained by arranging entire images including said updated image based on the present setting and several kinds of images by applying image processing settings that are different from each other in a predetermined arrangement pattern, and in said second step, said frame image based on said second print data is printed on said printing medium. In one alternative, the frame image is formed by arranging said entire first image in the center and arranging said entire second images of several kinds in a predetermined arrangement pattern centering the first image. In another alternative, the frame image is formed by displaying parameter values set to said first image and said second images of several kinds at predetermined positions respectively corresponding to the first image and the second images of several kinds.

In yet another embodiment the present invention is a printing method of printing a first image based on supplied first print data on a printing medium, comprising, a first step of selecting predetermined image processing for said first print data, a second step of applying the selected predetermined image processing based on a present setting to said first print data, and a third step of printing said entire first image based on said first print data subjected to said image processing, on said printing medium, wherein, in said second step, when a predetermined operation mode is selected in said first step, generating second print data for a frame image formed by arranging second entire images including an image based on the present setting of several kinds of images obtained by applying the image processing settings different from each other to said first image, in a predetermined arrangement pattern, and updating said first image based on the present setting by one of the image processing settings that are different from each other, and generating updated second print data for a frame image obtained by arranging entire images including said updated image based on the present setting and several kinds of images by applying image processing settings that are different from each other in a predetermined arrangement pattern, and in said third step, said frame image based on second print data is printed on said printing medium. The method may include that the frame image is formed by arranging said entire first image in the center and arranging said entire second images of several kinds in said predetermined arrangement pattern centering the first image. In one alternative, the frame image is formed by displaying parameter values set to said first image and said second images of several kinds at predetermined positions respectively corresponding to the first image and the second images of several kinds.

In yet another embodiment, the present invention comprises a printing medium for a printer which prints a first image based on supplied first print data on a printing medium, wherein, said printer comprising, an image processor for applying predetermined image processing based on a present setting to said first print data, and a printer for printing said entire first image based on said first print data subjected to said image processing on said printing medium, wherein the image processor, when a predetermined operation mode is selected, generates second print data for a frame image obtained by arranging second images including an image based on the present setting of several kinds of images obtained by applying the image processing settings that are different from each other to said first image, in a predetermined arrangement pattern, and said image processor updates said first image based on the present setting by one of the image processing settings that are different from each other, and generates updated second print data for a frame image obtained by arranging entire images including said updated image based on the present setting and several kinds of images by applying image processing settings that are different from each other in a predetermined arrangement pattern, and said printer prints said frame image based on said second print data on said printing medium. An embodiment includes where the frame image is formed by arranging said entire first image in the center and arranging said entire second images of several kinds in a predetermined arrangement pattern centering the first image. Another embodiment includes where the frame image is formed by displaying parameter values set to said first image and said second images of several kinds at predetermined positions respectively corresponding to the first image and the second images of several kinds. Another embodiment includes where the predetermined arrangement pattern is the one in which said entire first image is arranged in the center and said second images of several kinds are arranged centering the first image on the basis of the parameter values of the second images. Another embodiment includes that the parameter value is comprised of the color components of the color adjustment processing for said image, and the parameter value of the second image is the value of the color components changed on the basis of the parameter value of said first image by the color adjustment processing. And, another embodiment includes that the predetermined operation mode represents at least one processing out of color adjustment processing, lightness adjustment processing, masking processing, 7 compensation processing, enlargement/reduction processing, sharpness adjustment processing, and trimming processing.

In yet another embodiment, the present invention comprises a method of printing an image comprising, processing image data according to a predetermined first image process based on a present setting to form a first processed image, processing the image data according to at least one other second image process to produce at least one second processed image, printing the entire first processed image and the entire at least one other second processed image in a predetermined pattern on a printing medium, selecting a preferred image from among the images printed on the printing medium, selecting parameter values to adjust parameters of the preferred image, processing the preferred image according to the selected parameter values, printing the processed preferred image along with at least one image processed according to parameter values different from, but related to, the selected parameter values, and repeating the steps of, selecting a preferred image from among the images printed on the printing medium, selecting parameter values to adjust parameters of the preferred image, processing the preferred image according to the selected parameter values, and printing the processed preferred image along with at least one image processed according to parameter values different from, but related to, the selected parameter values, until a desired image is produced.

In yet another embodiment, the present invention is a printer comprising, an operation input unit, an image processor, and a printing unit, wherein, the image processor generates an entire first image based on parameter values input to the operation input unit and at least one entire second image based on parameter values related to the parameter values input to the input unit, the printing unit prints the entire first image and the at least one entire second image on a printing medium, and a selected image and new parameter values are input to the operation input unit based upon the printed entire first image and the at least one entire second image. In one embodiment, the image processor processes the selected image with the new parameter values, and generates at least one entire third image, based on the input new parameter values. In another embodiment, the printing unit prints the entire processed selected image and the at least one entire third image on a printing medium.

And, in yet another embodiment, the present invention comprises a printer, comprising: an image processor configured to apply a series of image processing settings to a first image to produce a series of second images that include images with a progressively higher image processing setting than the first image and images with a progressively lower image processing setting than the first image; a print section configured to, print the first image on a printing medium, print each second image having progressively higher image processing settings in a first direction relative to the printed first image, and print each second image having progressively lower image processing settings in a second direction relative to the printed first image; and an input section configured to retrieve a user selection of one of the second images; wherein: the image processor is further configured to apply a next series of image processing settings to the selected second image to produce a third set of images; and the print section is further configured to print the selected second image and the third set of images. In one alternative, the image processing settings comprise at least one of R, G, B, tint, brightness, and sharpness. In another alternative, the image processing settings comprise a tint comprising R, G, and B settings, the second images are printed so as to surround the first image; and the third images are printed so as to surround the selected second image. In yet another alternative, the image processor and print section are configured to repeatedly prepare and print images until a desired image is produced.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A printer, comprising:
    an image processor configured to apply a series of image processing settings to a first image to produce a series of second images that include images with a progressively higher image processing setting than the first image and images with a progressively lower image processing setting than the first image;
    a print section configured to,
    print the first image on a printing medium,
    print each second image having a progressively higher image processing setting in a first direction relative to the printed first image, and
    print each second image having a progressively lower image processing setting in a second direction relative to the printed first image; and
    an input section configured to retrieve a user selection of one of the second images;
    wherein:
    the image processor is further configured to apply a next series of image processing settings which are set for forming a set of images in a plus or minus direction for each of parameter values to the selected second image to produce a third set of images;
    the print section is further configured to print the selected second image and the third set of images; and
    said selected second image and each of said third set of images are printed with corresponding parameter values which are expressed as a change value from an initial parameter value of the first image.

2. The printer according to claim 1, wherein the image processing settings comprise at least one of R, G, B, tint, brightness, and sharpness.

3. The printer according to claim 1, wherein:
    the image processing settings comprise a tint comprising R, G, and B settings;
    the second images are printed so as to surround the first image; and
    the third images are printed so as to surround the selected second image.

4. The printer according to claim 1, wherein the image processor and print section are configured to repeatedly prepare and print images until a desired image is produced.

* * * * *